-

US010793471B2

(12) United States Patent
Bürge et al.

(10) Patent No.: US 10,793,471 B2
(45) Date of Patent: Oct. 6, 2020

(54) COMPOSITION BASED ON CALCIUM OXIDE

(71) Applicant: SIKA TECHNOLOGY AG, Baar (CH)

(72) Inventors: Christian Bürge, Schafisheim (CH); Gilbert Mäder, Marthalen (CH); Franz Wombacher, Jonen (CH)

(73) Assignee: SIKA TECHNOLOGY AG, Baar (CH)

( * ) Notice: Subject to any disclaimer, the term of this patent is extended or adjusted under 35 U.S.C. 154(b) by 97 days.

(21) Appl. No.: 16/083,467

(22) PCT Filed: Mar. 21, 2017

(86) PCT No.: PCT/EP2017/056745
§ 371 (c)(1),
(2) Date: Sep. 7, 2018

(87) PCT Pub. No.: WO2017/162700
PCT Pub. Date: Sep. 28, 2017

(65) Prior Publication Data
US 2019/0084880 A1    Mar. 21, 2019

(30) Foreign Application Priority Data

Mar. 22, 2016  (EP) .................................... 16161765
Mar. 22, 2016  (EP) .................................... 16161766
Mar. 22, 2016  (EP) .................................... 16161767

(51) Int. Cl.
| | | |
|---|---|---|
| C04B 22/06 | (2006.01) | |
| C04B 28/02 | (2006.01) | |
| C09K 8/467 | (2006.01) | |
| C04B 40/00 | (2006.01) | |
| C04B 22/10 | (2006.01) | |
| C04B 24/00 | (2006.01) | |
| C04B 24/10 | (2006.01) | |
| C04B 24/28 | (2006.01) | |
| C04B 40/06 | (2006.01) | |
| C04B 103/12 | (2006.01) | |
| C04B 103/14 | (2006.01) | |
| C04B 103/00 | (2006.01) | |

(52) U.S. Cl.
CPC ............ C04B 22/064 (2013.01); C04B 22/10 (2013.01); C04B 24/003 (2013.01); C04B 24/10 (2013.01); C04B 24/283 (2013.01); C04B 28/02 (2013.01); C04B 40/0039 (2013.01); C04B 40/065 (2013.01); C09K 8/467 (2013.01); *C04B 2103/0092* (2013.01); *C04B 2103/12* (2013.01); *C04B 2103/14* (2013.01); *C04B 2201/50* (2013.01)

(58) Field of Classification Search
CPC ..... C04B 22/064; C04B 22/10; C04B 24/003; C04B 24/10; C04B 24/283; C04B 28/02; C04B 40/0039; C04B 40/065; C04B 2103/12; C04B 2103/14; C04B 2103/0092; C04B 2201/50; C09K 8/467
See application file for complete search history.

(56) References Cited

U.S. PATENT DOCUMENTS

| | | | |
|---|---|---|---|
| 4,800,088 A * | 1/1989 | Sawhill ................. | A23K 40/20 426/623 |
| 5,160,376 A | 11/1992 | Kikuchi et al. | |
| 6,395,075 B1 * | 5/2002 | Doumet ................. | C04B 28/26 106/2 |
| 7,150,839 B1 * | 12/2006 | Saulsbery ............. | C09K 11/54 252/301.16 |
| 2005/0160376 A1 | 7/2005 | Sciammarella et al. | |
| 2017/0073267 A1 * | 3/2017 | Gallucci ............... | C04B 24/003 |

FOREIGN PATENT DOCUMENTS

| | | | | |
|---|---|---|---|---|
| CN | 102211888 A * | 10/2011 | | |
| DE | 36 32 364 A1 | 3/1988 | | |
| DE | 20 2004 019 019 U1 | 1/2005 | | |
| DE | 202004019019 U1 * | 1/2005 | ............. | C04B 24/10 |
| EP | 1 348 729 A1 | 10/2003 | | |
| EP | 138 697 B1 | 11/2003 | | |
| EP | 1 061 089 B1 | 3/2004 | | |
| EP | 2 128 110 A1 | 12/2009 | | |
| EP | 2 468 696 A1 | 6/2012 | | |
| EP | 2 522 680 A1 | 11/2012 | | |
| GB | 1361266 A * | 7/1974 | ........... | A23K 20/163 |
| RU | 2159747 C2 * | 11/2000 | ............. | C04B 22/10 |
| RU | 2288197 C1 | 11/2006 | | |
| RU | 2006116570 A | 11/2007 | | |
| RU | 2012149412 A | 5/2014 | | |
| SU | 1217813 A * | 3/1986 | | |
| WO | 03/000617 A1 | 1/2003 | | |
| WO | 2015/177232 A1 | 11/2015 | | |

(Continued)

OTHER PUBLICATIONS

Petrocal OS100 Calcium Oxide, Mississippi Lime, Technical Data Sheet (Year: 2016).*

(Continued)

*Primary Examiner* — Anthony J Green

(74) *Attorney, Agent, or Firm* — Oliff PLC

(57) ABSTRACT

A composition, in particular a setting accelerator for mineral binders, containing or being made of: a) calcium oxide in the particle form; b) an inhibitor for the reaction of calcium oxide with water and c) optionally water.

17 Claims, No Drawings

(56) References Cited

FOREIGN PATENT DOCUMENTS

| WO | WO-2017087326 A1 * | 5/2017 | ................ C01F 5/02 |
| WO | WO-2017162698 A1 * | 9/2017 | ......... C04B 40/0039 |

OTHER PUBLICATIONS

Mar. 5, 2019 Office Action issued in European Patent Application No. 15 732 676.0.
Sep. 25, 2018 International Preliminary Report on Patentability issued in International Patent Application No. PCT/EP2017/056745.
XP-002770562, Database WPI, Week 200116, 2001.
Jun. 8, 2017 International Search Report issued in International Patent Application No. PCT/EP2017/056745.
Apr. 22, 2020 Office Action issued in Colombian Patent Application No. NC2018/0010691.
English Translation of Jun. 29, 2020 Office Action issued in Russian Patent Application No. 201827550/03(043964).

* cited by examiner

COMPOSITION BASED ON CALCIUM OXIDE

TECHNICAL FIELD

The invention relates to compositions containing calcium oxide, in particular curing accelerators for mineral binders, corresponding binder compositions and moldings produced therefrom. Furthermore, the invention relates to uses and processes, including for accelerating the curing of a mineral binder composition, and for producing compositions. The invention further relates to the uses of selected substances for stabilizing a composition containing calcium oxide and water.

PRIOR ART

The production of cement generates a considerable amount of $CO_2$ which is relevant to the climate. In order to reduce the $CO_2$ emissions, cement in binder compositions can be partly replaced by latent-hydraulic and/or pozzolanic cement additives such as fly ashes, slags or silica dust. Such additives are formed as by-products in various industrial processes and are therefore advantageous in respect of the $CO_2$ balance. However, the setting of such cement additives takes significantly longer than in the case of hydraulic cement without additional measures. This is a disadvantage particularly in respect of high early strengths of binder compositions. It is therefore necessary to accelerate the setting and curing of binder compositions containing latent-hydraulic and/or pozzolanic additives.

Similar problems occur in the production of finished concrete or steel-reinforced concrete parts and also in road or runway renovation. Here, a high early strength is usually required so that the finished parts can be taken out from the formwork, transported, stacked or prestressed or the roads or runways can be driven on or loaded after only a few hours. For this reason, acceleration of the curing process is desirable or necessary in the case of such applications, too.

To achieve this objective in practice, use is made not only of high-performance concrete formulations having, for example, low w/c values or high cement contents but also of specific substances which accelerate the curing of mineral binders, in particular cement-based binders. Curing accelerators based on amino alcohols, halides, pseudohalides, nitrites, nitrates, aluminum salts, glycols, glycerol or α-hydroxycarboxylic acids, for example, are also customary.

Many of the curing accelerators known today relate to spray concrete. These accelerators have the effect of making the cement or concrete mixtures set very quickly after addition of the accelerator, which is usually desirable in spray concrete applications. However, when the mineral binder compositions have to be processed further after mixing with water, such known accelerator systems are not very suitable.

WO 2003/000617 A1 (Sika AG) describes, for example, a curing accelerator for mineral binder compositions which is based on an alkanolamine, an inorganic nitrate, a carboxylic acid and a polyol.

Although such known accelerators are usually quite effective, they frequently have the disadvantage that they are expensive, have a restricted field of use and sometimes have a strongly negative influence on the processing time and the final strengths of mortar and concrete.

Accelerators as are described in EP 2 128 110 A1 (Sika Technology AG) are likewise known. Such systems are based on esters of polyhydric alcohols and make it possible to attain a high early strength without having too great a negative influence on the processing time or the final strength. A further development thereof is described in WO 2015/177232 A1 (Sika Technology AG), in which calcium compounds are additionally used. However, it has been found that the effect of such accelerators can vary depending on the point in time at which they are added or the state of the binder components.

In addition to the abovementioned applications, specific requirements also have to be met in, for example, the production, sealing, lining and/or repair of boreholes, e.g. in underground boreholes in the construction of petroleum and natural gas wells. High temperatures and/or pressures frequently prevail here, which makes, for example, cementing or sealing in such regions particularly demanding. In addition, cement slurries or borehole cements usually have specific compositions which are not directly comparable to conventional mortars or concrete compositions. Conventional admixtures, for example curing accelerators, are therefore sometimes of only limited effectiveness under such specific conditions.

There is therefore also a need for new and improved solutions which if possible overcome the abovementioned disadvantages and in particular make the construction or provision of buildings, structural parts, finished parts, seals, coatings and the like in the building sector simpler and/or more efficient.

DESCRIPTION OF THE INVENTION

It is therefore an object of the present invention to make the construction or provision of buildings, structural parts, components, finished parts, seals, coatings and the like in the building sector simpler and/or more efficient. For this purpose, appropriate agents or compositions which advantageously should also be effective under demanding conditions, for example at high pressures and/or high temperatures, in conjunction with mineral binders and can be used very flexibly for various and different applications should be provided. Specifically, an improved curing accelerator for mineral binders should be provided. The curing accelerator of the invention should give, in particular, higher early strengths of cement, mortar and/or concrete compositions compared to known curing accelerators and be flexibly usable. In addition, the curing accelerator should have little or no adverse effect on the processability of mineral binder compositions which have been mixed with water. A curing accelerator which where possible can be used flexibly regardless of the state or the quality of the binder components is likewise desirable. In particular, the effect of the curing accelerator should remain very constant independently of the point in time at which it is added. In addition, appropriate processes and uses which effectively allow achievement of these objectives should be provided.

It has surprisingly been found that the object of the invention can be achieved by a composition as claimed in claim 1.

The composition of the invention, in particular a curing accelerator for mineral binders, accordingly comprises or consists of:
a) calcium oxide in particle form,
b) an inhibitor for the reaction of calcium oxide with water and
c) optionally water.

It has been found that the inventive combination of calcium oxide in particle form and an inhibitor for the reaction of calcium oxide with water makes it possible to produce compositions which can be premixed with water before mixing a mineral binder composition and remain stable in this form over a prolonged period of time, in particular up to a number of hours.

Furthermore, the compositions of the invention display an essential constant effect independently of the point in time of addition when used as curing accelerators. In particular, such compositions remain effective over a prolonged period of time when they are added to a component of the composition, e.g. a binder and/or the aggregates, before mixing of a mineral binder composition with water. This is in particular also true when the component of the binder composition contains residual moisture, as is normally the case for aggregates, for example. Overall, increased flexibility in the use of the compositions or the accelerators is thus achieved.

Furthermore, the compressive strengths of mineral binder compositions can be significantly increased by the compositions of the invention, in particular 4-8 hours after mixing with water. In addition, the compositions of the invention are of extreme interest with regard to the cost/performance ratio. It has also been found that the compositions of the invention are significantly less problematical than known accelerators in respect of the undesirable stiffening behavior of mineral binders or mineral binder compositions, in particular cement-based systems.

In comparison with unaccelerated mineral binder compositions, the compositions of the invention when used as accelerators in practice allow, for example, a significantly earlier removal from the formwork or loading of finished parts produced. At the same time, however, the processability of the compositions which have been accelerated according to the invention is nevertheless maintained at a suitable practical level over a comparatively long period of time.

Furthermore, it has been found that the compositions of the invention are effective as curing accelerators over wide ranges regardless of the quality of the aggregates used. In particular, it has been found that it is possible to produce accelerators whose effect is impaired little or not at all by the presence of magnesium carbonate which can occur, for example, as secondary constituent in a proportion of up to a few percent by weight in limestone fillers or sands.

In addition, possibly problematical substances such as chlorides, nitrates, nitrites and thiocyanates may be able to be dispensed with when the compositions of the invention are used as curing accelerators. This can be without a significant deterioration in the accelerating effect having to be accepted.

Further advantages of the compositions of the invention are that their stability over time can be set in a targeted manner, for example via the amount of the inhibitor used. This makes it possible to use the compositions for a variety of applications. Thus, the compositions can, for example, be used as accelerating additives in various mineral binder compositions, e.g. spray concrete compositions, borehole cement compositions, cement slurry compositions, mortar compositions and/or concrete compositions.

Further aspects of the invention are subject matter of further independent claims. Particularly preferred embodiments of the invention are subject matter of the dependent claims.

WAYS OF CARRYING OUT THE INVENTION

In a first aspect, the invention provides a composition, in particular a curing accelerator, containing or consisting of:

a) calcium oxide in particle form,
b) an inhibitor for the reaction of calcium oxide with water and
c) optionally water.

For the present purposes, an "inhibitor" is a substance which influences one or more chemical reactions so that they are slowed, inhibited and/or prevented. The inhibitor according to the claims acts predominantly on the reaction of calcium oxide with water, in which calcium oxide or CaO reacts to form calcium hydroxide or $Ca(OH)_2$. The inhibitor according to the claims is thus suitable for slowing, inhibiting or preventing this reaction. The inhibitor used is, in particular, able to stabilize an aqueous slurry or suspension of the calcium oxide for at least 15 minutes, preferably for at least 30 minutes, advantageously for at least 60 minutes, especially for at least 120 minutes, so that the amount of the calcium oxide used in the composition decreases by not more than 10% by weight, in particular not more than 5% by weight or not more than 1% by weight, during this time under standard conditions (room temperature of 25° C.; atmospheric pressure 1 atm).

The term "particle" or "particle shape" refers for the present purposes to solids having an average particle size of less than 1000 µm, in particular less than 500 µm, preferably less than 100 µm. The particle size, the distribution thereof or the average particle size can, in particular, be determined by laser light scattering, preferably in accordance with the standard ISO 13320:2009. In particular, a Mastersizer 2000 instrument with a Hydro 2000G dispersing unit and the Mastersizer 2000 software from Malvern Instruments GmbH (Germany) is used for this purpose. Isopropanol, for example, is suitable as measurement medium. The average particle size for the present purposes corresponds, in particular, to the D50 value (50% of the particles are smaller than the value indicated, 50% are correspondingly larger).

The expression "mineral binder" refers in particular to a binder which in the presence of water reacts in a hydration reaction to form solid hydrates or hydrate phases. This can be, for example, a hydraulic binder (e.g. cement or hydraulic lime), a latent hydraulic binder (e.g. slag), a pozzolanic binder (e.g. fly ash) or a nonhydraulic binder (gypsum plaster or white lime). A "mineral binder composition" is accordingly a composition containing at least one mineral binder.

For the present purposes, a "cement-based binder" or a "cement-based binder composition" is, in particular, a binder or a binder composition having a proportion of at least 5% by weight, in particular at least 20% by weight, preferably at least 35% by weight, specially at least 65% by weight, of cement clinker. The cement clinker is preferably a Portland cement clinker. In the present context, cement clinker is, in particular, milled cement clinker.

In particular, the mineral binder or the binder composition contains a hydraulic binder, preferably cement. Particular preference is given to a cement having a cement clinker content of ≥35% by weight; in particular the cement is of the type CEM I, II or III, preferably cement of the type CEM I (in accordance with the standard EN 197-1). A proportion of the hydraulic binder in the total mineral binder is advantageously at least 5% by weight, in particular at least 20% by weight, preferably at least 35% by weight, especially at least 65% by weight. In a further advantageous embodiment, the mineral binder consists to an extent of at least 95% by weight of a hydraulic binder, in particular cement clinker.

However, it can also be advantageous for the binder composition to contain other binders in addition to or instead of a hydraulic binder. These are, in particular, latent hydraulic binders and/or pozzolanic binders. Suitable latent hydraulic and/or pozzolanic binders are, for example, slag, fly ash and/or silica dust. The binder composition can likewise contain inert materials such as ground limestone, quartz flour and/or pigments. In an advantageous embodiment, the mineral binder contains 5-95% by weight, in particular 5-65% by weight, especially 15-35% by weight, latent hydraulic and/or pozzolanic binders.

In particular, the mineral binder composition contains, in each case based on the binder content, 0.001-3% by weight, in particular 0.01-1% by weight, especially 0.1-0.5% by weight, of magnesium carbonate.

The term "curing accelerator" refers, in particular, to a substance which, when added to a mineral binder and compared to a blank without added substance or without curing accelerator, leads to an increase in the compressive strength of the mineral binder after a defined point in time after mixing with water. This can be, in particular, after 4-8 hours, especially after 6-8 hours. The determination of the compressive strengths is, in particular, carried out in accordance with the standard EN 12390-3:2009-07.

In particular, the composition is in the form of an aqueous suspension or slurry, with the calcium oxide being, in particular, present in the form of suspended particles. Such suspensions can, for example, be produced up to several hours before actual use of the composition, e.g. as curing accelerator, or addition to a binder composition and remain essentially stable during this time.

The slurry or suspension is, in particular, storage-stable for at least 5 minutes, in particular for at least 15 minutes, preferably for at least 30 minutes, advantageously for at least 60 minutes, especially for at least 120 minutes. "Storage-stable" in the present context means that the amount of calcium oxide used in the composition decreases by not more than 10% by weight, in particular not more than 5% by weight or not more than 1% by weight, during the period of time under consideration under standard conditions (room temperature of 25° C.; atmospheric pressure 1 atm).

The composition, in particular a curing accelerator, particularly preferably contains or consists of:
a) 3-98% by weight, in particular 25-75% by weight, of calcium oxide and
b) 0.1-70% by weight, in particular 0.5-10% by weight, of the inhibitor and
c) 1-95% by weight, in particular 25-75% by weight, of water,
in each case based on the total weight of the curing accelerator.

The composition particularly preferably contains or consists of:
a) 25-75% by weight, in particular 40-60% by weight, of calcium oxide;
b) 0.1-15% by weight, in particular 0.1-10% by weight, preferably 0.2-5% by weight, especially 0.3-2% by weight, of the inhibitor for the reaction of calcium oxide with water; and
c) optionally 25-75% by weight, in particular 40-60% by weight, of water;
in each case based on the total weight of the composition, where the composition is, in particular, present as slurry or suspension.

Special preference is given to a composition or a curing accelerator comprising 40-60% by weight of calcium oxide, 0.2-5% by weight, in particular 1-5% by weight, of the inhibitor and 40-60% by weight of water, in each case based on the total weight of the composition or the curing accelerator. The composition, in particular the curing accelerator, is in this case particularly preferably in the form of a slurry.

The inhibitor is advantageously selected from among a phosphoric acid ester of a polyhydric alcohol and/or from carbohydrates. These substances have been found to be advantageous in the present case since firstly they have a good inhibiting action and secondly they do not impair the effect of the CaO, or they even improve it.

In a particularly preferred embodiment, the inhibitor comprises a phosphoric acid ester of a polyhydric alcohol. As has been found, phosphoric acid esters of polyhydric alcohols not only act as inhibitors but in combination with the calcium oxide also reinforce the accelerating action thereof overproportionally. These substances can thus function synergistically so that a far greater accelerating effect is achieved than with the individual substances alone.

Phosphoric acid esters of polyhydric alcohols, in particular glyceryl phosphate, disodium glyceryl phosphate and/or a hydrate thereof also act as accelerators and/or as co-accelerators for the calcium oxide in the present context.

The phosphoric acid esters of polyhydric alcohols are accordingly bifunctional since they have an inhibiting effect on the reaction of water with calcium oxide but at the same time have an accelerating effect in mineral binders. This is surprising and could not have been expected in this way.

The term "polyhydric alcohol" refers to a hydroxy-functional compound having more than one hydroxyl group, for example having two, three, four or five hydroxyl groups. Particular preference is given to an alcohol having three hydroxyl groups, i.e. a trihydric alcohol. Suitable alcohols are, for example, polyhydric alkyl alcohols such as propanediol, butanediol, glycerol, diglycerol, polyglycerol, trimethylolethane, trimethylolpropane, 1,3,5-pentanetriol, erythritol, pentaerythritol, dipentanerythritol, sorbitol, sorbitan, glucose, fructose, sorbose or isosorbide. Particular preference is given to glycerol.

The phosphoric acid ester of a polyhydric alcohol can be obtained from a polyhydric alcohol by esterification with phosphoric acid and/or a salt of phosphoric acid. The ester is preferably a part ester or partial ester of a polyhydric alcohol, preferably of a trihydric alcohol. The term "part ester or partial ester of a polyhydric alcohol" means that the polyhydric alcohol still has one or more free hydroxyl groups in addition to one or more ester bonds. The ester can be a monoester, diester or triester. Preference is given to a monoester, preferably a monoester of a dihydric or trihydric alcohol, particularly preferably of a trihydric alcohol, especially preferably of glycerol.

The phosphoric acid for preparing the ester can be present as free acid or as salt or partial salt, with the term "salt" referring, here and in the following, to the product of a neutralization reaction of phosphoric acid with a base and the phosphates formed after drying. "Partial salt" means that not all acid functions of the phosphoric acid have been neutralized.

Any remaining free acid groups of the phosphoric acid ester are preferably completely or partially neutralized so as to give a metal salt, in particular an alkali metal salt and/or alkaline earth metal salt. In particular, the salt is a salt of a monovalent or polyvalent cation, preferably a sodium, potassium, calcium, magnesium, zinc and/or aluminum salt, particularly preferably a sodium and/or aluminum salt. In a basic, aqueous medium, the free acid groups can of course also be deprotonated and be present in anionic form.

Suitable phosphoric acid esters for the curing accelerator of the invention are, for example, glyceryl phosphates. Preference is given to glyceryl monophosphate, with particular preference being given to glyceryl 2-phosphate, glyceryl 3-phosphate and/or hydrates thereof.

The at least one phosphoric acid ester very particularly preferably comprises glyceryl phosphate, disodium glyceryl phosphate and/or a hydrate thereof.

In a further advantageous embodiment, the inhibitor comprises at least one carbohydrate. For the present purposes, the term carbohydrate also encompasses, in particular, derivatives.

The carbohydrate comprises, in particular, at least one representative of the group consisting of fructose, sucrose, glucose, lactose, mannose, ribose, galactose, fucose, rhamonose, lactulose, maltose, trehalose, melezitose, raffinose, molasses, caramel and umbelliferose. It is likewise possible to use, for example, glycerol, gluconate, in particular sodium gluconate, hydrolyzed starch and/or feed molasses.

The at least one carbohydrate particularly preferably comprises a monosaccharide and/or a disaccharide. The at least one carbohydrate very particularly preferably comprises molasses, glucose, fructose and/or sucrose. Particular preference is given to glucose, fructose and/or sucrose, especially glucose.

It is also possible to use, for example, a combination of a phosphoric acid ester of a polyhydric alcohol and a carbohydrate as inhibitor. This combination is advantageously made up of the abovementioned representatives which have been described as advantageous, in particular a combination of glyceryl phosphate, disodium glyceryl phosphate and/or a hydrate thereof together with molasses, glucose, fructose and/or sucrose.

The calcium oxide very particularly preferably has a specific surface area of 1-50 $m^2/g$, preferably 1.5-30 $m^2/g$, in particular 1.9-10 $m^2/g$ of calcium oxide. The determination of the specific surface area is, in particular, carried out by the BET method ($N_2$ adsorption, measured in accordance with DIN ISO 9277:2003-05). A high specific surface area leads to an improvement in the accelerating effect. In order to achieve the same accelerating effect, it is possible to use a smaller proportion of calcium oxide having a high specific surface area compared to calcium oxide having a lower specific surface area.

If the inhibitor comprises a phosphoric acid ester of a polyhydric alcohol, the amount of the phosphoric acid ester relative to the amount of the calcium oxide is preferably adapted so that from 0.001 to 0.05 g, preferably from 0.005 to 0.04 g, particularly preferably from 0.008 to 0.02 g, of phosphoric acid ester is present per $m^2$ of calcium oxide.

A weight ratio of the calcium oxide to the at least one phosphoric acid ester of a polyhydric alcohol is advantageously in the range 100:1-1:1, preferably 50:1-5:1, in particular 30:1-10:1. Such ratios give optimal accelerating effects combined with good processability of the binder compositions.

The composition, in particular a curing accelerator, is particularly preferably in the form of a slurry or suspension and contains or consists of, in each case based on the total weight of the composition:
a) 25-75% by weight, in particular 40-60% by weight, of calcium oxide;
b) 0.5-10% by weight, in particular 1-5% by weight, of a phosphoric acid ester of a polyhydric alcohol, in particular glyceryl phosphate, disodium glyceryl phosphate and/or a hydrate; and
c) 25-75% by weight, in particular 40-60% by weight, of water.

In a further advantageous embodiment, the composition of the invention, in particular a curing accelerator, contains at least one alkali metal carbonate.

For the present purposes, the term "carbonate" refers to salts and/or esters of carbonic acid ($H_2CO_3$). In particular, the carbonates in question are salts. Two series of salts are derived from the diprotonic (dibasic) carbonic acid: (i) the hydrogencarbonates, also referred to as primary carbonates ($MHCO_3$; based on the hydrogencarbonate anion $HCO_3^-$) and (ii) the secondary carbonates ($M_2CO_3$; based on the carbonate anion $CO_3^{2-}$). Here, "M" represents a metal ion or a mixture of different metal ions, in the present case an alkali metal ion or a mixture of different alkali metal ions.

In the present context, secondary carbonates ($M_2CO_3$) have been found to be preferred. Accordingly, the alkali metal carbonate is preferably a secondary carbonate or a compound of the formula $M_2CO_3$.

In particular, the alkali metal of the at least one alkali metal carbonate comprises sodium and/or potassium. The at least one alkali metal carbonate more particularly comprises sodium carbonate ($Na_2CO_3$) and/or potassium carbonate ($K_2CO_3$). Very particular preference is given to sodium carbonate ($Na_2CO_3$).

If the inhibitor comprises a phosphoric acid ester of a polyhydric alcohol, the weight ratio of the at least one phosphoric acid ester of a polyhydric alcohol to the at least one alkali metal carbonate in the composition or in the use thereof is advantageously in the range 1:1-10:1, preferably 1.5:1-5:1, in particular 2:1-3:1. Particularly strong curing accelerations are achieved therewith, especially after 4-8 days, and the processability of the binder compositions can at the same time be maintained in a range which is of practical relevance.

In an advantageous embodiment, the at least one phosphoric acid ester comprises glyceryl phosphate, disodium glyceryl phosphate and/or a hydrate thereof and the at least one alkali metal carbonate comprises sodium carbonate ($Na_2CO_3$) and/or potassium carbonate ($K_2CO_3$). Very particular preference is given here to sodium carbonate ($Na_2CO_3$). Such compositions have been found to be particularly effective without significantly impairing the processability of mineral binder compositions.

In a further advantageous embodiment, the composition of the invention, in particular a curing accelerator, is used in combination with at least one further curing-accelerating substance or contains this. In principle, it is in this case possible to use many substances known to a person skilled in the art. However, the further curing-accelerating substance particularly advantageously comprises one or more of the following representatives:
a) one or more further amino alcohols and/or salts thereof
b) one or more alkali metal nitrates and/or alkaline earth metal nitrates
c) one or more alkali metal nitrites and/or alkaline earth metal nitrites
d) one or more alkali metal thiocyanates and/or alkaline earth metal thiocyanates
e) one or more α-hydroxycarboxylic acids
f) one or more alkali metal halides and/or alkaline earth metal halides
g) glycerol and/or glycerol derivatives
h) one or more glycols and/or glycol derivatives
i) one or more aluminum salts
j) one or more alkali metal hydroxides and/or alkaline earth metal hydroxides As has been found, the inventive compositions or curing accelerators are generally readily compatible with these representatives of further curing-accelerating substances. Flexible matching to specific uses, for example, can thus be realized.

It can also be advantageous for the composition, in particular a curing accelerator, to be used in combination with at least one admixture, for example a concrete admixture and/or a mortar admixture, and/or process chemicals. The at least one admixture comprises, in particular, an antifoam, a dye, a preservative, a plasticizer, an inhibitor, an air pore former, a shrinkage reducer and/or a corrosion inhibitor or combinations thereof.

The composition, in particular a curing accelerator, is advantageously used together with a plasticizer or fluidizer or contains such an agent. Possible plasticizers are, for example, lignosulfonates, sulfonated naphthaline-formaldehyde condensates, sulfonated melamine-formaldehyde condensates, sulfonated vinyl copolymers, polycarboxylates, polycarboxylate plasticizers or mixtures thereof.

The plasticizer comprises, in particular, a polycarboxylate, specially a polycarboxylate ether. In particular, the plasticizer is a comb polymer comprising a polycarboxylate backbone with polyether side chains bound thereto. The side chains are, in particular, bound via ester, ether, imide and/or amide groups to the polycarboxylate backbone.

Advantageous plasticizers are, for example, copolymers of (meth)acrylic acid and/or maleic acid monomers and monomers selected from among polyalkylene glycol vinyl ethers, polyalkylene glycol (meth)allyl ethers or polyalkylene glycol isoprenyl ethers. Particularly suitable plasticizers are, for example, copolymers of maleic acid or derivatives thereof, allyl ethers, in particular allyl polyethylene glycols, and vinyl acetate. Such copolymers and the preparation thereof are described, for example, in EP 2 468 696 A1 (Sika Technology AG). Especially suitable plasticizers are, for example, the copolymers P-1 to P-4 as are described in paragraphs 0058 to 0061 and table 1 of EP 2 468 696 A1.

Plasticizers which are likewise suitable are, for example, copolymers of maleic acid or derivatives thereof, allyl ethers, in particular allyl polyethylene glycols, and (meth)acrylic acid. Such copolymers and the preparation thereof are described in EP 2 522 680 A1 (Sika Technology AG). Advantageous plasticizers are, for example, the copolymers P-1 to P-4 as are described in paragraphs 0063 to 0070 and table 1 of EP 2 522 680 A1.

Further suitable polycarboxylate ethers and processes for preparing them are disclosed, for example, in EP 1 138 697 B1 on page 7, line 20 to page 8, line 50, and also in the examples therein or in EP 1 061 089 B1 on page 4, line 54 to page 5, line 38 and also in the examples therein. In one variant, as is described in EP 1 348 729 A1 on page 3 to page 5 and also in the examples therein, the comb polymer can be prepared in the solid aggregate state.

The disclosures of the patent texts mentioned in connection with the plasticizers are, in particular, hereby incorporated by reference.

Appropriate comb polymers are also commercially available from Sika Schweiz AG under the tradename series ViscoCrete®.

In particular, a weight ratio of the at least one plasticizer to the at least one phosphoric acid ester of a polyhydric alcohol is in the range 1:1-10:1, preferably 1.5:1-5:1, in particular 2:1-3:1. It is possible to achieve, for example, good plasticizing effects at the same time as effective curing acceleration thereby. The plasticizer barely impairs, if at all, the effect of the curing accelerator.

The composition, in particular a curing accelerator, can in principle be present in a variety of forms. In particular, the individual components of the composition can be present spatially separately from one another as individual components, in particular as a "kit of parts". However, it is also possible to premix individual or all components of the accelerator in solid and/or liquid form.

In particular, the composition of the invention, in particular a curing accelerator, is in the form of an at least two-component composition, with calcium oxide, inhibitor and optionally water being present in a first component while further constituents of the composition are present together in at least one second component or are present separately from one another as further individual components. It is possible, for example, to improve the storage stability and/or effectiveness thereby. In this case, the first component preferably does not contain any water.

The components of the at least two-component composition are, in particular, present spatially separately, e.g. in at least two individual containers or in one container having at least two spatially separate regions.

For example, a composition, in particular a curing accelerator, in the form of a two-component composition having a first component containing 3-98% by weight, in particular 25-75% by weight, of calcium oxide, 0.1-70% by weight, in particular 0.5-10% by weight, of the inhibitor and 1-95% by weight, in particular 25-75% by weight, water and a second component containing an alkali metal carbonate is particularly suitable.

Any further constituents such as a plasticizer can be present in the first component and/or in a second component and/or in a further, spatially separate component. The further component can, for example, be present in a further individual container or in a further spatially separate region of a container having a plurality of spatially separate regions.

The composition, in particular a curing accelerator, or one or more of the components, in particular accelerator components, can be present in liquid and/or solid form. If the composition or the components is/are present in liquid form, they are in particular aqueous solutions or aqueous dispersions. If the composition or one or more of the components is/are present in solid form, these are used, for example, as powder, pellets, flakes and/or applied to a solid support material.

In a further aspect, the present invention provides a composition, in particular a binder composition, containing a component of a mineral binder composition, in particular a binder and/or aggregates and/or an admixture, and also a composition as described above, in particular a curing accelerator. In particular, the composition is a binder composition containing a mineral binder. The mineral binder, the aggregates and the admixture are here as defined above. The composition can, for example, be present in dry form or as a fluid or stiffened binder composition mixed with mixing water. The composition can also be present as a cured binder composition, e.g. as molding.

A proportion of the curing accelerator based on the weight of a binder, if present, is in particular 0.01-10% by weight, especially 0.1-5% by weight.

For the purposes of the present invention, the calcium oxide is preferably introduced into the binder composition in such an amount that a ratio of the total surface area of the calcium oxide to the amount of mineral binder of from about 50 to 70 $m^2$/kg of binder, preferably from about 55 to 65 $m^2$/kg of binder, particularly preferably from about 57 to 63 $m^2$/kg of binder, is established. The total surface area of the calcium oxide is for the present purposes the mathematical product of the specific surface area [in $m^2$/g; determined by the BET method ($N_2$ adsorption, measured in accordance with DIN ISO 9277:2003-05)] and the amount used (in gram per kg of mineral binder).

In particular, the binder composition contains, based on the weight of the binder:
a) calcium oxide in a proportion of from 0.001 to 10% by weight, preferably from 0.1 to 9% by weight, especially 2-9% by weight, particularly preferably from 2.5 to 6% by weight;
b) the inhibitor in an amount of from 0.001 to 5% by weight, preferably from 0.005 to 1% by weight, particularly preferably from 0.01 to 0.6% by weight or from 0.1 to 0.3% by weight.

If a phosphoric acid ester of a polyhydric alcohol, in particular glyceryl phosphate, disodium glyceryl phosphate and/or a hydrate thereof, is used as inhibitor in a binder composition, this ester is preferably present in an amount of from 0.001 to 5% by weight, preferably from 0.005 to 1% by weight, particularly preferably from 0.01 to 0.6% by weight or from 0.1 to 0.3% by weight, based on the amount of binder.

If a carbohydrate, in particular a monosaccharide and/or a disaccharide, for example fructose and/or sucrose, is used as inhibitor in a binder composition, this carbohydrate is advantageously present in an amount of 0.001-1% by weight, in particular 0.005-0.5% by weight, in particular 0.01-0.125% by weight, based on the amount of binder.

The binder composition particularly preferably contains, based on the weight of the binder:
a) calcium oxide in a proportion of from 0.001 to 10% by weight, preferably from 0.1 to 9% by weight, especially 2-9% by weight, particularly preferably 2.5-6% by weight;
b) a phosphoric acid ester of a polyhydric alcohol, in particular glyceryl phosphate, disodium glyceryl phosphate and/or a hydrate thereof, in an amount of from 0.001 to 5% by weight, preferably from 0.005 to 1% by weight, particularly preferably from 0.01 to 0.6% by weight or from 0.1 to 0.3% by weight;
c) optionally a carbohydrate, in particular a monosaccharide and/or a disaccharide, for example fructose and/or sucrose, in an amount of 0.001-1% by weight, in particular 0.005-0.5% by weight, in particular 0.01-0.125% by weight;
d) optionally an alkali metal carbonate, in particular sodium carbonate ($Na_2CO_3$) and/or potassium carbonate ($K_2CO_3$), in an amount of from 0.001 to 6% by weight, preferably from 0.01 to 2% by weight, particularly preferably from 0.02 to 0.1% by weight or 0.04-0.08% by weight.

In particular, the composition additionally contains a plasticizer as described above. If present, the plasticizer is advantageously present in a proportion of 0.01-6% by weight, in particular 0.1-4% by weight, more preferably 0.5-3% by weight, based on the mineral binder. The combination with the plasticizer enables the processability of the binder composition to be improved and higher compressive strengths are achieved at the same time. The latter is particularly true at later times, e.g. after 28 days.

Optionally, an admixture as described above, in particular a concrete admixture and/or a mortar admixture, and/or a further curing-accelerating substance is additionally present in the composition.

Apart from specific uses, it is generally particularly advantageous for the compositions of the invention, in particular curing accelerators, not to be combined with certain substances. In particular, the compositions of the invention do not contain any additional nitrates and/or nitrites. This is due, in particular, to the toxicity and corrosiveness of such compounds. Likewise, the compositions of the invention advantageously do not contain any additional thiocyanates. Thiocyanates are a hazard to health and are likewise problematical from the point of view of corrosion. In addition, it can also be particularly advantageous for the compositions of the invention not to comprise any additional halides, alkali metal hydroxides, aluminum salts, glycerol and/or α-hydroxycarboxylic acids. However, the composition, in particular a curing accelerator, can nevertheless be combined with such substances for a specific application.

An additional aspect of the present invention relates to a molding which is obtained by curing a composition as described above comprising at least one mineral binder after addition of water. The molding produced in this way can have virtually any desired shape and be, for example, a constituent of a building work, e.g. a building, a masonry structure, a borehole or a bridge.

In a further aspect, the invention provides a process for producing a composition, in particular a binder composition. Here, a composition as described above, in particular a curing accelerator, is mixed with at least one constituent of a binder composition, in particular a binder, aggregates and/or the mixing water. In particular, part of the composition, in particular the curing accelerator, or a component of the composition, especially the entire composition, is added before the binder composition is mixed with water.

The composition, in particular a curing accelerator, is in particular in the form of a slurry or suspension. The suspension preferably contains or consists of:
a) 3-98% by weight, in particular 25-75% by weight, of calcium oxide and
b) 0.1-70% by weight, in particular 0.5-10% by weight, of the inhibitor and
c) 1-95% by weight, in particular 25-75% by weight, of water.

In particular, the composition, preferably a curing accelerator, or a component thereof is added to a solid constituent of the binder composition, in particular to a binder and/or aggregates, before addition of mixing water. The solid constituent here has, in particular, a residual moisture content, in particular a proportion of residual moisture of 0.001-20% by weight, preferably 0.01-10% by weight, in particular 0.1-5% by weight, based on the total weight of the constituent including residual moisture.

However, it is also possible to use completely dry constituents.

The residual moisture content can, for example, be determined gravimetrically in a manner known per se. Here, the water content or the content of residual moisture, for example of a sample of the solid constituent material, can be determined via the weight loss on drying.

For this purpose, the sample of the material is, after being taken, packed in an airtight manner and weighed. The sample is subsequently dried at, for example, about 105° C. in a drying oven until a constant weight is found in successive weighings.

The drying time and temperature is, in particular, selected as a function of the material so that no chemically bound water is liberated during drying. For this reason, the drying temperature can be selected, depending on the solid constituent, below, for example, 105° C., e.g. in the case of gypsum plaster at about 40° C. However, a longer drying time results at a relatively low drying temperature. Since measurements are carried out until the weight is constant in successive weighings, drying temperature and drying time do not play any role in respect of the content of residual moisture.

After drying, the sample of the material is weighed again. The water content of the sample of the material or the content of residual moisture can be determined from the difference between the weighings.

Measurements of the residual moisture content using electromagnetic radiation, e.g. microwaves, are likewise possible. Appropriate instruments are commercially available, e.g. the microwave sensor Hydro-Probe from Hydronix (Netherlands).

A composition, in particular a curing accelerator, in the form of, for example, an at least two-component composition having a first component containing 3-98% by weight, in particular 25-75% by weight, of calcium oxide, 0.1-70% by weight, in particular 0.5-10% by weight, of the inhibitor and 1-95% by weight, in particular 25-75% by weight, water and a second component containing an alkali metal carbonate and optionally further constituents is particularly suitable for the process.

In this case, the first component of the composition, in particular of the curing accelerator, is, in particular, added to a solid constituent of the binder composition, in particular to a binder and/or aggregates, before addition of mixing water. In a further step, the second component is then added, e.g. together with the mixing water.

The composition, in particular a curing accelerator, is used, in particular, in a proportion of 0.01-10% by weight, in particular 0.1-5% by weight, based on the weight of the binder. The amounts of calcium oxide, inhibitor and optionally alkali metal carbonate which are preferably used are the same as those which have been described above in connection with the composition or the binder composition.

In particular, a plasticizer as described above is additionally mixed in, in particular in a proportion of 0.01-6% by weight, in particular 0.1-4% by weight, more preferably 0.5-3% by weight, based on the content of mineral binder.

Optionally, an admixture as described above, in particular a concrete admixture and/or a mortar admixture, and/or a further curing-accelerating substance can additionally be added.

The constituents of the composition, in particular a curing accelerator, or the composition, in particular a curing accelerator, can in principle be added to the mineral binder at any point in time before or during mixing with water.

In a further variant, the composition, in particular a curing accelerator, preferably without water, can be added to the mineral binder at least in part, in particular in its entirety, before and/or during a milling process for the mineral binder. In this way, the substances are mixed particularly well with the mineral binder and an additional mixing operation becomes unnecessary. It has surprisingly been found that the effect of the composition, in particular of a curing accelerator, is not impaired by the milling process.

As has been indicated above, it is, apart from specific uses, generally particularly advantageous for the compositions of the invention, in particular curing accelerators, not to be combined with certain substances. In particular, the compositions of the invention are used without additional nitrates and/or nitrites. Likewise, the compositions of the invention are advantageously used without additional thiocyanates. In addition, it can also be particularly advantageous for the compositions of the invention to be used without additional halides, alkali metal hydroxides, aluminum salts, glycerol and/or α-hydroxycarboxylic acids.

According to a further aspect, the present invention relates to the use of a composition, preferably a curing accelerator, in particular in the form of a suspension or slurry, for accelerating the curing of mineral binders and/or binder compositions, in particular a cement-based binder composition, preferably a mortar borehole cement composition and/or concrete composition.

The composition of the invention can likewise be used for accelerating the setting and/or curing of spray concrete compositions.

In particular, the composition of the invention is used for increasing the compressive strength of a mineral binder composition after 6 minutes, 1 hour, 4 hours, 6 hours, 8 hours, 1 day, 2 days and/or 28 days. The compressive strength concerned is especially that after 4-8 hours.

Furthermore, the composition of the invention can advantageously be used as setting and/or curing accelerator at high temperatures, in particular above 50° C., and/or high pressures, in particular more than 1.5 bar. The temperatures here are especially above 75° C., in particular above 100° C. or above 150° C. The pressures are in particular above 10 bar, especially above 50 bar or above 100 bar.

In particular, the composition of the invention can be used in deep wells, extra-deep wells, well drill holes and/or in boreholes.

The invention further provides for the use of a phosphoric acid ester of a polyhydric alcohol and/or a carbohydrate for stabilizing a composition containing calcium oxide and water and/or for inhibiting the reaction of calcium oxide with water. This applies particularly in the presence of constituents of a mineral binder composition, especially aggregates and/or a mineral binder.

The phosphoric acid ester of a polyhydric alcohol and/or the carbohydrate is used in particular for controlling the stability over time of a composition containing calcium oxide and water and/or for controlling the inhibition of the reaction of calcium oxide with water over time. Here, in particular, the stability over time is controlled via the amount of the inhibitor.

In particular, a phosphoric acid ester of a polyhydric alcohol is used for stabilizing a composition containing calcium oxide with water and/or for inhibiting the reaction of calcium oxide with water and also at the same time for accelerating the curing of mineral binders and/or binder compositions containing calcium oxide, in particular a cement-based binder composition, preferably a mortar composition and/or concrete composition.

The inhibitors used, in particular phosphoric acid esters of polyhydric alcohols and carbohydrates are defined as described above. Particular preference is given to using glyceryl phosphate, disodium glyceryl phosphate and/or a hydrate as phosphoric acid ester of polyhydric alcohols.

The following working examples illustrate the invention.

WORKING EXAMPLES

1. Substances and Methods
1.1. Substances
The following substances were used for the working examples:

TABLE 1

Substances used

| Abbreviation | Substance |
| --- | --- |
| PCE | Polycarboxylate ether plasticizer (e.g. Sika ® Viscocrete ® 20 HE, obtainable from Sika Schweiz AG); solids content: 40% by weight |
| GPD | Glyceryl phosphate disodium salt (obtainable from Sigma Aldrich Schweiz); 10% by weight in $H_2O$ |

TABLE 1-continued

Substances used

| Abbreviation | Substance |
|---|---|
| NaCt | Sodium carbonate; 10% by weight in $H_2O$ |
| CaOx | Calcium oxide (Nekafin ® 2 from Kalkfabrik Netstal AG, Switzerland, having a specific surface area (BET) of 1.9 $m^2$/g) |
| CarC | Caramel Colour 1085 (sugar color of the type INS No. 150a, obtainable from Sugro AG, Switzerland); dry content: 60% by weight |
| Fruct | Fructose in powder form |
| Gluc | D (+) glucose monohydrate in powder form |
| Suc | Sucrose in powder form |
| Glyc | Glycerol (>90%) |
| NaGlu | Sodium gluconate in powder form |

Sodium carbonate is commercially available from various suppliers in pure form (purity >97%). This was in each case dissolved in the amount indicated in table 1 in water and used as aqueous solutions.

1.2. Production of Slurries 1.2.1 Slurry containing GPD

A slurry consisting of 24 g of CaOx, 16 g of water and 12 g of GPD (=1.2 g of glyceryl phosphate disodium salt and 10.8 g of water) was produced by mixing. The slurry will hereinafter be referred to as slurry SL.

The slurry SL produced in this way has been found to be storage-stable for at least 30 minutes.

1.2.2 Further Slurries

Furthermore, slurries containing various other inhibitors were produced. All slurries contained 30 g of CaOx, 28 g of water and the inhibitors indicated in the table below in the specified amounts.

TABLE 2

| Designation | Inhibitor | Amount [g] | Stability [min] |
|---|---|---|---|
| SLK1 | CarC | 0.25 | 1 |
| SLK2 |  | 0.5 | 2 |
| SLK3 |  | 1.0 | 9 |
| SLK4 | Fruc | 0.1 | 2.5 |
| SLK5 |  | 0.25 | 10 |
| SLK6 |  | 0.5 | 18 |
| SLK7 | Glu | 0.13 | 1 |
| SLK8 |  | 0.19 | 3 |
| SLK9 |  | 0.25 | 15 |
| SLK10 |  | 0.5 | 40 |
| SLK11 | Glyc | 0.5 | 20 |
| SLK12 | Suc | 0.25 | 3 |
| SLK13 |  | 0.5 | 10 |
| SLK14 |  | 3.0 | 66 |
| SLK15 | NaGlu | 0.5 | 4 |

The stabilities of the slurries SLK1-SLK15 produced in this way are shown in the table and can be set to values in the range from 1 to 66 minutes by means of the type and amount of the inhibitor.

1.3. Mortar Mixtures

The mortar mixture M1 used has the dry compositions described in table 3.

TABLE 3

Dry composition of mortar mixture

| Component | M1 |
|---|---|
| Portland cement of the type CEM I 52.5 R (Normo 5R; obtainable from Holcim Schweiz) | 750 g |
| Limestone filler* | 141 g |
| Sand 0-1 mm* | 738 g |
| Sand 1-4 mm* | 1107 g |
| Sand 4-8 mm* | 1154 g |

*Residual moisture contents of the aggregates used in each case may be found in table 4.

To make up the mortar mixtures, the sands, the limestone filler, the cement and optionally a slurry or CaOx were mixed dry at a temperature of 20° C. for 1 minute in a Hobart mixer. The mixing water (water/cement value or w/c=0.44), to which the polycarboxylate ether plasticizer (PCE; always 0.9% by weight based on cement) and optionally further substances (NaCt, GPD) had previously been added was introduced over a period of 30 seconds and the mixture was mixed for a further 2.5 minutes. The total wet mixing time was in each case 3 minutes.

1.3. Test Methods

To determine the effectiveness of the slurries as curing accelerators, the compressive strengths of various mortar mixtures were determined 6 hours after mixing the mortar mixtures with water. The test to determine the compressive strength (in $N/mm^2$) was carried out on prisms (40×40×160 mm) in accordance with the standards EN 12390-1 to 12390-4.

Immediately after the mortar mixtures had been mixed with water, the respective flow value (FV) was also measured. The flow value (FV) of the mortar mixtures was measured in accordance with EN 1015-3.

The moisture content of the aggregates (sands, limestone filler) was determined gravimetrically as described above.

2. Mortar Tests

To demonstrate the effects of the curing accelerators of the invention, various mortar tests were carried out.

The experiments A1, B1 and C1 are comparative experiments in which no curing-accelerating additives apart from the plasticizer (PCE) were added. In the experiments A2, B2 and C2, the slurry SL was in each case mixed dry with the sand, the limestone filler and the cement as described in chapter 1.3 before addition of the mixing water. The slurry SL was in each case produced about 10 minutes before addition. In the experiments A3, B3 and C3, CaOx was mixed dry with the sand, the limestone filler and the cement before addition of the mixing water and GPD was added together with the mixing water.

The experiments A1-A3 were carried out using completely dry aggregates (0% by weight of moisture), while moist aggregates were used in each of the experiments B1-B3 and C1-C3.

TABLE 4

Result of mortar tests

| No. | Moisture content of aggregates[1] | NaCt[2] | CaOx[3] | GPD[2] | SL[#] | FV[+] [mm] | Compressive strength after 6 h [MPa] |
|---|---|---|---|---|---|---|---|
| A1 | 0 | — | — | — | — | 230 | 0.9 |
| A2 |  | 0.06 | — | — | 6.5 | 204 | 8.3 |
| A3 |  | 0.06 | 3.00 | 1.50 | — | 195 | 7.9 |
| B1 | 2 | — | — | — | — | 232 | 0.8 |
| B2 |  | 0.06 | — | — | 6.5 | 202 | 7.4 |

TABLE 4-continued

Result of mortar tests

| No. | Moisture content of aggre-gates[1] | NaCt[2] | CaOx[3] | GPD[2] | SL[#] | FV[+] [mm] | Compressive strength after 6 h [MPa] |
|---|---|---|---|---|---|---|---|
| B3 | | 0.06 | 3.00 | 1.50 | — | 235 | 0.9 |
| C1 | 6 | — | — | — | — | 232 | 0.8 |
| C2 | | 0.06 | — | — | 6.5 | 178 | 5.9 |
| C3 | | 0.06 | 3.00 | 1.50 | — | 235 | 0.9 |

[1] % by weight based on the total weight of the aggregates (sand and gravel, including residual moisture)
[2] Addition together with mixing water; % by weight based on cement content
[3] Addition to aggregates before addition of the mixing water; % by weight based on cement content
[#] Addition to dry mixture; % by weight based on cement content
[+] Flow value immediately after mixing with water Comparison of the experiments A2 and A3 shows that the slurry SL produced beforehand has at least as good an effect as curing accelerator with dry aggregates as does the separate addition of the individual components. The processability is also maintained at a high level as without accelerator (experiment A1).

Experiment B2 shows that the accelerating effect of the slurry can be maintained even in the case of moist aggregates. In contrast, the prior addition of CaOx without inhibiting GPD (this is added only after a time delay together with the mixing water) to moist aggregates leads to a large decrease in the accelerating effect (experiment B3). This occurs even though the total amounts of CaOx and GPD used in the experiments B2 and B3 are essentially the same. However, owing to the absence of inhibitor in experiment B3, the CaOx is exposed to the moisture of the aggregates without protection. Comparison of the experiments C2 and C3 reveals an analogous picture.

The above-described embodiments should, however, be interpreted merely as illustrative examples which can be modified in any desired way within the scope of the invention.

Thus, for example, NaCt can be omitted as additional component in the examples. This results in lower compressive strengths. However, there is no qualitative change in terms of the actions and effects described.

Furthermore, a different inhibitor, e.g. a different phosphoric acid ester and/or a carbohydrate such as glucose, fructose and/or sucrose, can be used instead of or in addition to GPD.

It is likewise possible, for example, to replace the cement at least partly by a latent-hydraulic and/or pozzolanic binder. Larger aggregates can also be used in addition to or instead of the aggregates described (sands, limestone filler) in order to obtain, for example, a concrete composition. The above-described actions and effects are not changed thereby.

The invention claimed is:

1. A composition comprising:
   a) calcium oxide in particle form,
   b) an inhibitor for the reaction of calcium oxide with water and
   c) water; wherein
   the composition is present as a slurry or suspension and contains based on the total weight of the composition:
   25-75% by weight of the calcium oxide;
   0.5-10% by weight of the inhibitor, the inhibitor being a phosphoric acid ester of a polyhydric alcohol; and
   25-75% by weight of the water.

2. The composition as claimed in claim 1, wherein the composition is present as either an aqueous suspension that is storage-stable for at least 5 minutes or an aqueous slurry that is storage-stable for at least 5 minutes.

3. The composition as claimed in claim 1, wherein the phosphoric acid ester is selected from among glyceryl phosphate, disodium glyceryl phosphate and/or a hydrate thereof.

4. The composition as claimed in claim 1, wherein the calcium oxide has a specific surface area of 1-50 m$^2$/g of calcium oxide.

5. The composition as claimed in claim 1, wherein the composition is present as either an aqueous slurry that is storage-stable for at least 60 minutes or an aqueous suspension that is storage-stable for at least 60 minutes.

6. The composition as claimed in claim 1 further comprising at least one alkali metal carbonate.

7. The composition as claimed in claim 1, wherein the composition is present in the form of an at least two-component composition, with the calcium oxide, the inhibitor and the water being present in a first component while further constituents of the composition are present together in a second component or are present separately from one another as further individual components.

8. The composition as claimed in claim 1, further comprising a mineral binder composition.

9. The composition as claimed in claim 8, wherein the mineral binder composition contains at least one mineral binder and, in each case based on the binder content:
   a) calcium oxide in a proportion of from 0.001 to 10% by weight;
   b) a phosphoric acid ester of a polyhydric alcohol in an amount of from 0.001 to 5% by weight;
   c) optionally a carbohydrate in an amount of 0.001-1% by weight; and
   d) optionally an alkali metal carbonate in an amount of from 0.001 to 6% by weight.

10. A molding obtained by curing a composition as claimed in claim 8 after addition of water.

11. A process for producing a composition as claimed in claim 8 wherein a composition containing: calcium oxide in particle form, an inhibitor for the reaction of calcium oxide with water, the inhibitor being a phosphoric acid ester of a polyhydric alcohol, and water, is mixed with at least one constituent of a binder composition.

12. A method for accelerating the setting and/or curing of a mineral binder and/or a mineral binder composition, said method comprising adding a composition as claimed in claim 1 to the mineral binder and/or the mineral binder composition, and then setting and/or curing the mineral binder and/or the mineral binder composition.

13. The method as claimed in claim 12, wherein the mineral binder and/or the mineral binder composition is of a spray concrete composition.

14. The method as claimed in claim 12, wherein the composition is added to the mineral binder composition in an amount effective to increase the compressive strength of the mineral binder composition after 6 minutes from the time that the composition was added.

15. The method as claimed in claim 12, wherein the setting and/or the curing occurs at temperatures above 50° C. and/or at pressures of more than 1.5 bar.

16. A method comprising:
   adding a phosphoric acid ester of a polyhydric alcohol to a composition containing calcium oxide in particle form and water, the phosphoric acid ester being added in an amount effective to stabilize the composition and/or inhibit the reaction of calcium oxide with water; wherein the addition of the effective amount of phosphoric acid ester results in a composition that is present as slurry or suspension and contains based on the total weight of the composition:

25-75% by weight of the calcium oxide;
0.5-10% by weight of the phosphoric acid ester; and
25-75% by weight of the water.

17. The method as claimed in claim 16, wherein the addition of the effective amount of phosphoric acid ester to the composition maintains the stability of the slurry or the suspension over a period of time of at least 5 minutes, and/or the addition of the effective amount of phosphoric acid ester to the composition controls the inhibition of the reaction of the calcium oxide with the water such that over a period of time of at least 5 minutes the amount of the calcium oxide comprised in the composition does not decrease by more than 10% by weight.

\* \* \* \* \*